Patented Nov. 8, 1927.

1,648,166

UNITED STATES PATENT OFFICE.

OSCAR L. DILLON, JR., OF HERNANDO, MISSISSIPPI.

PROCESS OF PREPARING ROAD-BUILDING MATERIAL.

No Drawing.   Application filed May 27, 1927.   Serial No. 194,844.

My invention relates to the use, in building street and road surfaces, of mineral aggregates or stony materials containing matter of a character heretofore considered unsuitable for high grade pavements, such as asphaltic concrete or sheet asphalt. Materials of this character are gravel with clay, and sand with a clay infiltration, as they are often found in nature, or gravel containing loam. My invention is concerned with the use of materials of this kind in connection with a binder, such as asphalt or other bituminous binders.

Gravel and other materials with an appreciable content such as above mentioned are now used in road building, but not in connection with bituminous binders or the like. In the present state of the art, gravel containing clay cannot be used for asphaltic concrete, nor sand having an appreciable clay content for sheet asphalt. On the contrary, only "clean" materials,—such as clean crushed slag, stone, gravel, or sand,—can be used for asphalt pavements: i. e. it is imperative that the aggregate employed be free from the natural earthy matter so often found in sand and gravel, or that the aggregate be thoroughly cleansed before the usual addition of clean sand and/or crushed stone dust thereto,—which is often impracticable or unduly expensive. As at present used, without bituminous binders, such untreated mineral aggregates make poor road surfaces for modern traffic conditions,—their sole advantages being cheapness and easy availability in many localities.

The reason for the inability to use material containing clay or other such earthy matter with such binders is that such aggregates cannot be effectually bound and held together by the binder. This is because, as it would appear, the individual element or particles of gravel, rock, or sand cannot in such cases be properly coated with asphalt, nor the individual particles of clay or the like. For, first, when such material is dried and heated, clay adhering to the stony elements seems to bake on them in a shell-like coating, so that asphalt or the like cannot adhere directly to the stone itself, but only to its baked clay envelope. Secondly, in the natural condition, the clay not adhering to the stony elements seems never to be completely pulverized or disintegrated,—i. e., its fine grains or particles are not all separate and discrete, but somewhat loosely bound together into larger granules or lumps by cohesion induced by moisture or other conditions,—and when the material is dried and heated, the larger granules or lumps of clay are baked to some extent and cannot be penetrated by asphalt or the like, but only externally coated.

As the natural adhesion and cohesion of the earthly matter to the stone and of the earthly granules or lumps within themselves is not sufficiently strong to resist traffic, an asphaltic pavement made with such an earthy mineral aggregate rapidly disintegrates in service,—assuming a rough surface, pitting, and finally failing completely.

In using mineral aggregates containing earthy elements, such as above mentioned, I overcome their unsuitability for use with asphalt or the like by a treatment which, as it would appear, "cleans" the mineral aggregate by destroying the continuity of its clay envelope, and causes the clay (including that previously adherent to the stony elements) to cohere into particles of considerable hardness, or to form agglomerations of considerable strength. Or, possibly, the phenomena giving the favorable results may be—in part, at least—analogous to the reduction in viscosity that can be produced in the clay slips employed in the ceramic industry by the introduction of alkaline solutions. Whatever the exact theoretical explanation, I have found that the thus treated aggregate can now be used with bituminous binder for asphalt wearing surfaces.

Such alteration in behaviour toward binder can be produced by chemical treatment of the mineral aggregate, through the application to it of a spray, vapor, or other form of an alkaline solution, as of sodium hydroxide. This may be done while such aggregate, having been taken as naturally found to the plant where it is to be prepared, is being conveyed to the point where it is to be dumped into an ordinary drier, in which it is heated and dried as usual. While the material is in transit on the conveyor, the solution of sodium hydroxide can be easily applied by any suitable apparatus. The aggregate may be conveyed from the storage pile to the "boot" of the elevator serving the (revolving) drier by means of a trough and screw conveyor, and the alkaline solution supplied from a perforated spray pipe extending along immediately above this conveyor. I employ, preferably, a 2% solution of sodium hydroxide, moistening or wetting the aggregate with it to the point of saturation,—but not of puddling, or "dripping wet",—and afterward drying and heating it, in the drier, to the usual temperature for making paving mixtures, say 350 to 450° F. The amount of the solution used may be some 10% (by weight) of the aggregate being treated; but this and the strength of the solution must depend in some degree on the moisture content of the aggregate, and may be varied accordingly: i. e., for wet aggregate, a less amount of stronger solution should be used. After being thus treated and fully dried, the material is ready to be passed into any mechanism suitable for mixing asphaltic paving mixtures.

If in its natural state the aggregate is deficient in sand or dust,—as determined by screen analysis,—sand and/or dust are added in sufficient quantity to provide any predetermined or desired grading. The proportions of asphalt or bitumen to aggregate and its consistency are variables, dependent on many factors well known to one versed in the art.

While I have referred to sodium hydroxide in the foregoing description, yet it is to be understood that potassium hydroxide or other alkalies may be used, including alkaline carbonates, for example.

Having thus described my invention, I claim:

1. A process of preparing mineral aggregates, containing earthy matter, for use with bituminous binders; which process consists essentially in moistening such aggregates with an alkaline solution, and then drying and heating the same, before admixture with the bitumen.

2. A process of preparing mineral aggregates, found in nature with matter which when heated tends to bake cohesively, for use with bituminous binders; which process consists essentially in heating such aggregates with a chemical of the character of sodium hydroxide before admixture with the bitumen.

3. A process of preparing mineral aggregates containing clay for use with bituminous binder; which process consists essentially in treating such aggregates with a sodium hydroxide solution, and then drying and heating the same, before admixture with the bitumen.

In testimony whereof, I have hereunto signed my name at Panama City, Florida, this 19 day of May, 1927.

OSCAR L. DILLON, Jr.